United States Patent
Huang et al.

(10) Patent No.: US 9,391,533 B2
(45) Date of Patent: Jul. 12, 2016

(54) POWER TRANSMITTING APPARATUS FOR DIGITALLY CONTROLLING VOLTAGE AND CURRENT OF ALTERNATING CURRENT SIGNAL

(71) Applicants: Guan-Xiong Huang, Shenzhen (CN); Calvin Shie-Ning Wang, George Town (KY); Zhen-Qiu Huang, George Town (KY)

(72) Inventors: Guan-Xiong Huang, Shenzhen (CN); Calvin Shie-Ning Wang, George Town (KY); Zhen-Qiu Huang, George Town (KY)

(73) Assignees: Guan-Xiong Huang (CN); Calvin Shie-Ning Wang

( * ) Notice: Subject to any disclaimer, the term of this patent is extended or adjusted under 35 U.S.C. 154(b) by 280 days.

(21) Appl. No.: 14/140,550

(22) Filed: Dec. 26, 2013

(65) Prior Publication Data
US 2014/0184176 A1   Jul. 3, 2014

(30) Foreign Application Priority Data

Dec. 26, 2012 (CN) .......................... 2012 1 0573332

(51) Int. Cl.
*H02M 1/42* (2007.01)
*H02M 5/458* (2006.01)
*H02M 1/00* (2006.01)

(52) U.S. Cl.
CPC ...... *H02M 5/458* (2013.01); *H02M 2001/0012* (2013.01)

(58) Field of Classification Search
CPC . H02M 1/4208; H02M 1/4216; H02M 1/425; H02M 5/293; H02M 5/458; H02M 2001/0012; H02M 2205/2932; H02M 2005/2937
USPC ......... 323/211; 363/34–37, 40, 41, 55, 56.01, 363/56.03–56.08, 95, 97, 131
See application file for complete search history.

(56) References Cited

U.S. PATENT DOCUMENTS

| | | | | |
|---|---|---|---|---|
| 5,311,419 A | * | 5/1994 | Shires | H02M 1/4216 363/129 |
| 5,461,263 A | * | 10/1995 | Helfrich | H02J 9/062 307/64 |
| 5,625,545 A | * | 4/1997 | Hammond | H02M 3/285 363/65 |
| 5,698,908 A | * | 12/1997 | Pollmeier | G05F 1/62 307/141 |

(Continued)

*Primary Examiner* — Timothy J Dole
*Assistant Examiner* — Htet Z Kyaw
(74) *Attorney, Agent, or Firm* — ScienBiziP, P.C.

(57) ABSTRACT

A power transmitting apparatus for digitally controlling voltage and current of alternating current (AC) includes an input part, an output part, and a digital control part. The input part has a filtering protection module and a semiconductor switch module connected to the filtering protection module. The filtering protection module has an input interface for inputting an AC signal from a power source. The output part has a filtering module and a voltage and current feedback module connected to the filtering module. The voltage and current feedback module has an output interface for outputting the AC signal from the input part. The filtering module is connected to the semiconductor switch module of input part. The digital control part has a microcontroller unit (MCU) electrically connected to the filtering protection module, the semiconductor switch module, and the voltage and current feedback module, respectively.

20 Claims, 19 Drawing Sheets

(56) References Cited

U.S. PATENT DOCUMENTS

| | | | | |
|---|---|---|---|---|
| 5,801,931 A * | 9/1998 | Kino | ........................ | H02J 1/02 307/82 |
| 5,809,327 A * | 9/1998 | Wollan | ................ | G06F 15/7814 712/33 |
| 6,430,069 B1 * | 8/2002 | Drobnik | ................... | G06F 1/26 320/108 |
| 6,738,274 B2 * | 5/2004 | Prasad | ................ | H02M 1/4225 323/207 |
| 6,807,076 B1 * | 10/2004 | York | .................... | H02M 5/225 363/124 |
| 7,639,520 B1 * | 12/2009 | Zansky | .............. | H02M 1/4225 363/65 |
| 7,683,568 B2 * | 3/2010 | Pande | ................. | H02M 1/4216 318/438 |
| 8,193,785 B2 * | 6/2012 | Peto | ...................... | H02M 5/293 323/224 |
| 8,344,706 B2 * | 1/2013 | Green | ................ | H02M 1/4208 323/207 |
| 8,582,330 B2 * | 11/2013 | Kalms | ...................... | H02J 1/06 363/34 |
| 8,796,884 B2 * | 8/2014 | Naiknaware | ........ | H02M 7/4807 307/102 |
| 2007/0133241 A1 * | 6/2007 | Mumtaz | .............. | H02M 7/4807 363/131 |
| 2008/0155289 A1 * | 6/2008 | Fernald | ................ | G06F 1/3203 713/322 |
| 2010/0320926 A1 * | 12/2010 | Hsu | ..................... | H05B 39/041 315/246 |

* cited by examiner

POWER TRANSMITTING APPARATUS FOR DIGITALLY CONTROLLING VOLTAGE AND CURRENT OF ALTERNATING CURRENT SIGNAL

FIELD OF THE INVENTION

The field of this invention generally relates to power conversion, and more particularly, digital power conversion for AC/AC applications.

BACKGROUND OF THE INVENTION

The conventional device for AC/AC power conversion realizes control scheme through the implement of the conventional transformer or utilizes AC-DC-AC inverted-type control scheme, thus hardly achieving the purpose of precise control, simple circuit design, and size reduction of the device.

For instance, FIG. 1 illustrates the structure of a transformer that transfers voltage by inductive coupling between its winding circuits. A primary winding of the transformer is connected to an AC power source and thus AC is transformed and transmitted from a secondary winding of the transformer. FIG. 2 illustrates the schematic diagram showing the concept of transmitting an AC voltage signal by utilizing the transformer, and voltage $V_1$ and $V_2$ represent an input AC voltage and an output AC voltage, respectively.

FIG. 3 illustrates waveform transformation of conventional AC/AC conversion. An input sinusoidal wave of the AC signal from an AC power source is converted to a direct current (DC) waveform and the DC waveform is inversed to an output sinusoidal wave of the AC signal. The above process is able to be manipulated by a programmable controller to realize the conventional waveform transformation, but the characteristics the input sinusoidal wave of the AC signal is usually different from the output sinusoidal wave of the AC signal. Therefore, the conventional apparatus for AC/AC conversion is hard to make the characteristics the output sinusoidal wave of the AC signal substantially identical to the input sinusoidal wave of the AC signal, thus causing low power factor and electric network pollution.

SUMMARY OF THE INVENTION

In view of the above, an innovative power transmitting apparatus for digitally controlling voltage and current of alternating current is deemed necessary, thereby improving power factor, saving energy, and avoiding pollution of electric network so as to provide green energy resources.

In some embodiments, a power transmitting apparatus for digitally controlling voltage and current of alternating current (AC), comprises an input part, wherein the input part has a filtering protection module and a semiconductor switch module connected to the filtering protection module, the filtering protection module having an input interface for inputting an AC signal from a power source; an output part, wherein the output part has a filtering module and a voltage and current feedback module connected to the filtering module, the voltage and current feedback module having an output interface for outputting the AC signal from the input part, and wherein the filtering module is connected to the semiconductor switch module of input part; a digital control part, wherein the digital control part has a microcontroller unit (MCU) electrically connected to the filtering protection module, the semiconductor switch module, and the voltage and current feedback module, respectively; wherein the AC signal is sequentially transmitted through an input interface to the filtering protection module for voltage limitation and filtering and to the semiconductor switch module, and a trigger signal is sent from the filtering protection module to the MCU so as to switch the MCU into an operating mode while the filtering protection module outputs the AC signal to the semiconductor switch module; wherein the semiconductor switch module separates an input sinusoidal wave of the AC signal into amplitude-adjustable positive and negative half-wave signals, and the amplitude-adjustable positive and negative half-wave signals are filtered and merged to an output sinusoidal wave of the AC signal, the output sinusoidal wave substantially identical to the input sinusoidal wave; and wherein the voltage and current feedback module receives the output sinusoidal wave as feedback to the MCU so that the MCU is able to control the switching state of the semiconductor switch module, thereby forming a close loop.

In other embodiments, A power transmitting apparatus for digitally controlling voltage and current of alternating current, comprises a three-phase alternating current circuit, wherein the three-phase alternating current circuit is arranged in delta connection (Δ) or star connection (Y), wherein each phase of the three-phase alternating current circuit comprises an input part, wherein the input part has a filtering protection module and a semiconductor switch module connected to the filtering protection module, the filtering protection module having an input interface for inputting an AC signal from a power source; an output part, wherein the output part has a filtering module and a voltage and current feedback module connected to the filtering module, the voltage and current feedback module having an output interface for outputting the AC signal from the input part, and wherein the filtering module is connected to the semiconductor switch module of input part. In addition, a three-phase alternating current circuit has a digital control part, wherein the digital control part has a MCU electrically connected to each of the filtering protection modules, each of the semiconductor switch modules, and each of the voltage and current feedback module, respectively; wherein the AC signal is sequentially transmitted through an input interface to the filtering protection modules for voltage limitation and filtering and to the semiconductor switch modules, and a trigger signal is sent from the filtering protection modules to the MCU so as to switch the MCU into an operating mode while the filtering protection modules outputs the AC signal to the semiconductor switch modules; wherein each of the semiconductor switch module separates an input sinusoidal wave of the AC signal into amplitude-adjustable positive and negative half-wave signals, and the amplitude-adjustable positive and negative half-wave signals are filtered and merged to an output sinusoidal wave of the AC signal, the output sinusoidal wave substantially identical to the input sinusoidal wave; and wherein the voltage and current feedback modules receive the output sinusoidal waves as feedback to the MCU so that the MCU is able to control the switching state of the semiconductor switch modules, thereby forming a close loop.

Comparing the embodiments of the present invention to the conventional apparatus, it is obvious that the present invention has a plurality of advantages over the conventional apparatus.

Specifically, the embodiments of the present invention provides a power transmitting apparatus with precisely digital control scheme to reproduce and transmit a sinusoidal wave of the AC signal from the AC power source to a load, thereby improving power factor, saving energy, and avoiding pollution of electric network so as to provide green energy resources.

Additionally, the embodiments of the present invention can effectively reduce the complexity and size of the conventional apparatus to solve the problems of the conventional apparatus. Moreover, the present invention saves much usage of the non-ferrous metals (i.e. copper, aluminum) and the ferrous metals (i.e. iron, chromium) that can be applied in the fields of industry, the military, and the livelihood. For example, a terminal electronic power transformer of the livelihood, an AC voltage regulator of the welding machines, and an AC voltage regulator and driving circuit of the medical facilities.

The embodiments of the present invention may be employed to drive alternating-current generator, synchronous generator, and asynchronous generator with the a fixed speed, a variable speed, or a variable torque to achieve the best energy balance, thereby saving energy and replacing the conventional silicon controlled technology. The embodiments of the present invention may utilize to transmit and control single-phase or three-phase alternating current that be applied in the power fields of machinery manufacturing industry, chemistry industry, energy industry, electronic industry, light and textile industry, and hydraulic power generation industry.

For example, the medical equipments have the demand for providing a stable AC supply. The traditional nuclear magnetic resonance transformer has a larger size than the apparatus of the present invention, with slower response time. Compared to the second-response of the conventional apparatus, the millisecond-response of the apparatus in the present invention is apparently advantageous.

The embodiments of the present invention may be utilized in the household electric application for replacing the variable-frequency driving system to achieve the best operating mode for saving the energy. Also, the embodiments of the present invention may be classified into differential groups including the isolated type for the application of the electric driving system as well as the non-isolated type for the application of the voltage stabilizer, the voltage regulator, and the electric power transmitting apparatus.

The apparatus of the present invention can precisely control the input and the output parameters by adopting digital control to achieve auto-control and self-adaptive control.

BRIEF DESCRIPTION OF THE DRAWINGS

These and other features of the present invention will be more clearly understood from the following detailed description taken in conjunction with the accompanying drawings, in which like reference numerals designate identical or corresponding parts throughout the drawings, and in which.

DETAILED DESCRIPTION OF THE PRESENT INVENTION

Figure 1:
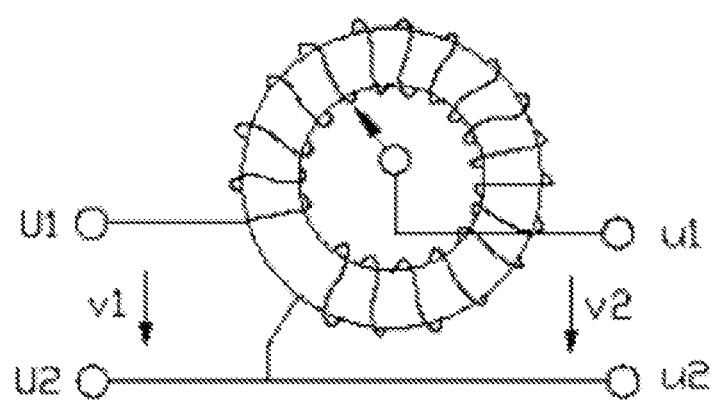
FIG. 1 is a known wiring diagram for transmitting and controlling alternating current.
Figure 2:
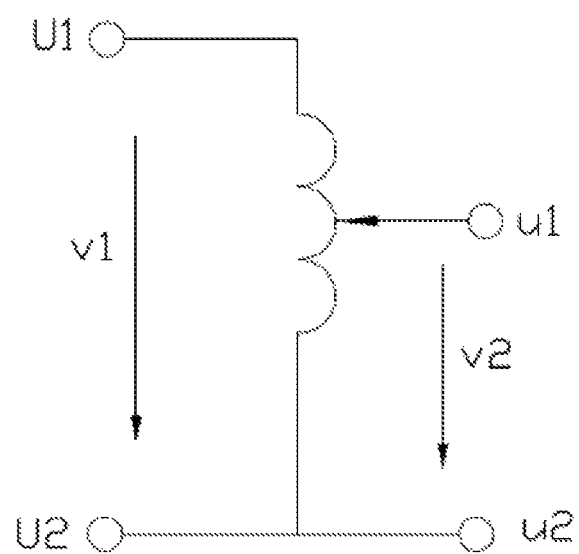
FIG. 2 is a known circuit diagram for transmitting and controlling alternating current.
Figure 3:
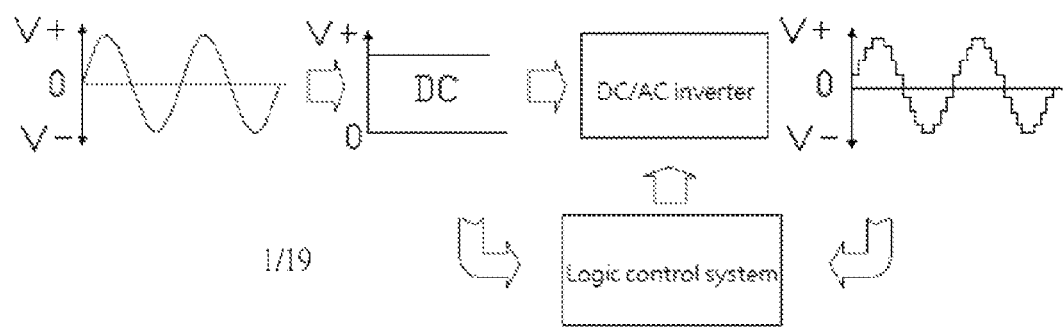
FIG. 3 is a schematic diagram showing the conventional AC/AC conversion.

The present invention will now be described more fully hereinafter with reference to the accompanying drawings, in which exemplary embodiments of the invention are shown. This invention may, however, be embodied in many different forms and should not be construed as limited to the embodiments set fourth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present invention in conjunction with the accompanying drawings in FIGS. 1-19. Reference will be made to the drawing figures to describe the present invention in detail, wherein depicted elements are not necessarily shown to scale and wherein like or similar elements are designated by same or similar reference numeral through the several views and same or similar terminology.

FIG. 4 to FIG. 13 illustrate the structures in accordance with a first embodiment of the present invention.

In the first embodiment, the power transmitting apparatus for digitally controlling voltage and current of alternating current is a non-isolated type power converter, including an input part 10, an output part 20, and a digital control part 30. The input part 10 has a filtering protection module 11 and a semiconductor switch module 12, and the output part 20 has a filtering module 21 and a voltage and current feedback module 22. In addition, the digital control module 30 has a microcontroller unit (MCU) 31.

Figure 4:
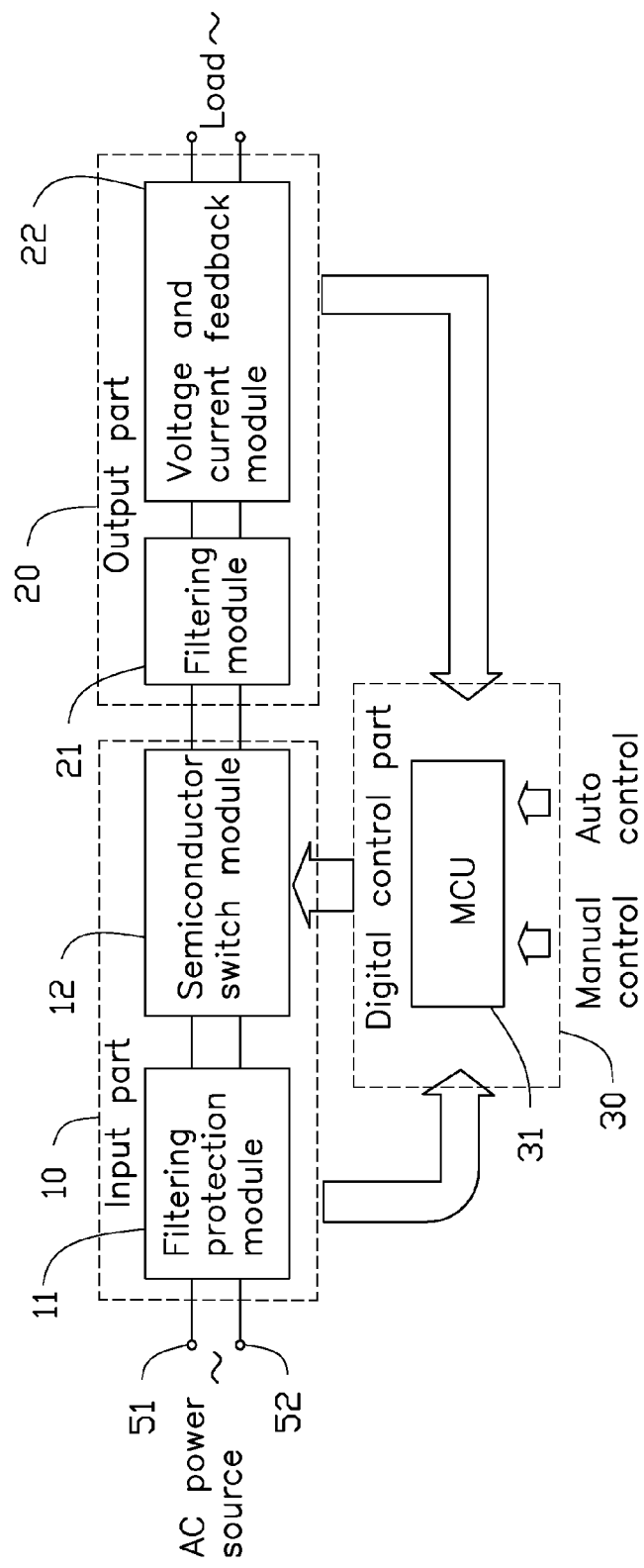
FIG. 4 is a schematic illustration of a non-isolated single-phase power transmitting apparatus for digitally controlling voltage and current of alternating current in accordance with a first embodiment of the present invention.
Figure 5:
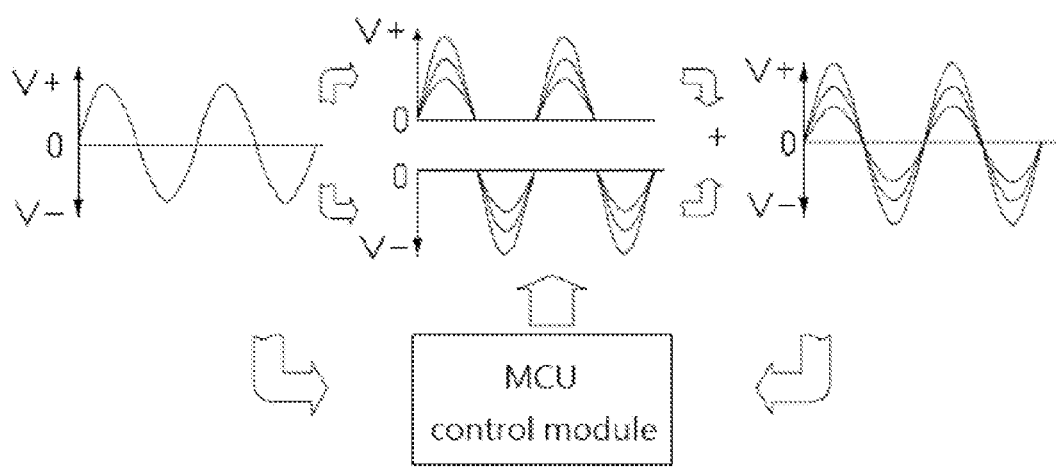
FIG. 5 is a schematic diagram showing the process of waveform transformation of a single-phase power transmitting apparatus for digitally controlling voltage and current of alternating current in accordance with the first embodiment of the present invention.

Referring to the FIG. 4 and FIG. 5, the filtering protection module 11 provides an input interface for inputting an AC signal from an AC power source and the voltage and current feedback module 22 provides an output interface for outputting the AC signal to a load. The MCU 31 is electrically connected to the filtering protection module 11, to the semiconductor switch module 12, and to the voltage and current feedback module 22 respectively, thereby forming a close loop. The AC signal is transmitted from the input interface of the filtering protection module 11 to the output interface of semiconductor switch module 22 via the semiconductor switch module 12 and the filtering module 21 in sequence. The filtering protection module 11 is used for voltage limitation and filtering protection of alternating current from the input interface of filtering protection module 11. After the filtering protection module 11 confirms that the alternating current from the input interface is in a safe condition, a trigger signal is sent from the filtering protection module 11 to switch the MCU 31 into an operating mode. Otherwise, the MCU 31 is in a standby mode. Preferably, the semiconductor switch module 12 is able to be a large power switching module and is used to separate the AC signal outputted from the filtering protection module into amplitude-adjustable positive and negative half-wave signals. The filtering module 21 is used to filter and merge the amplitude-adjustable positive and negative half-wave signals such that an output sinusoidal wave of the AC signal is formed and substantially identical to an input sinusoidal wave of the AC signal from the AC power source. The voltage and current feedback module 22 is used to collect a voltage signal and/or a current signal of the output sinusoidal wave and provide the voltage signal and/or the current signal as feedback to the MCU 31. Therefore, the MCU 31 is able to control the switching state of the semiconductor switch module 12 according to the voltage and current signals of the AC output, thus accurately controlling and managing the output sinusoidal wave of the AC signal. Additionally, the MCU 31 may have a manual control mode and an automatic control mode.

Figure 6:
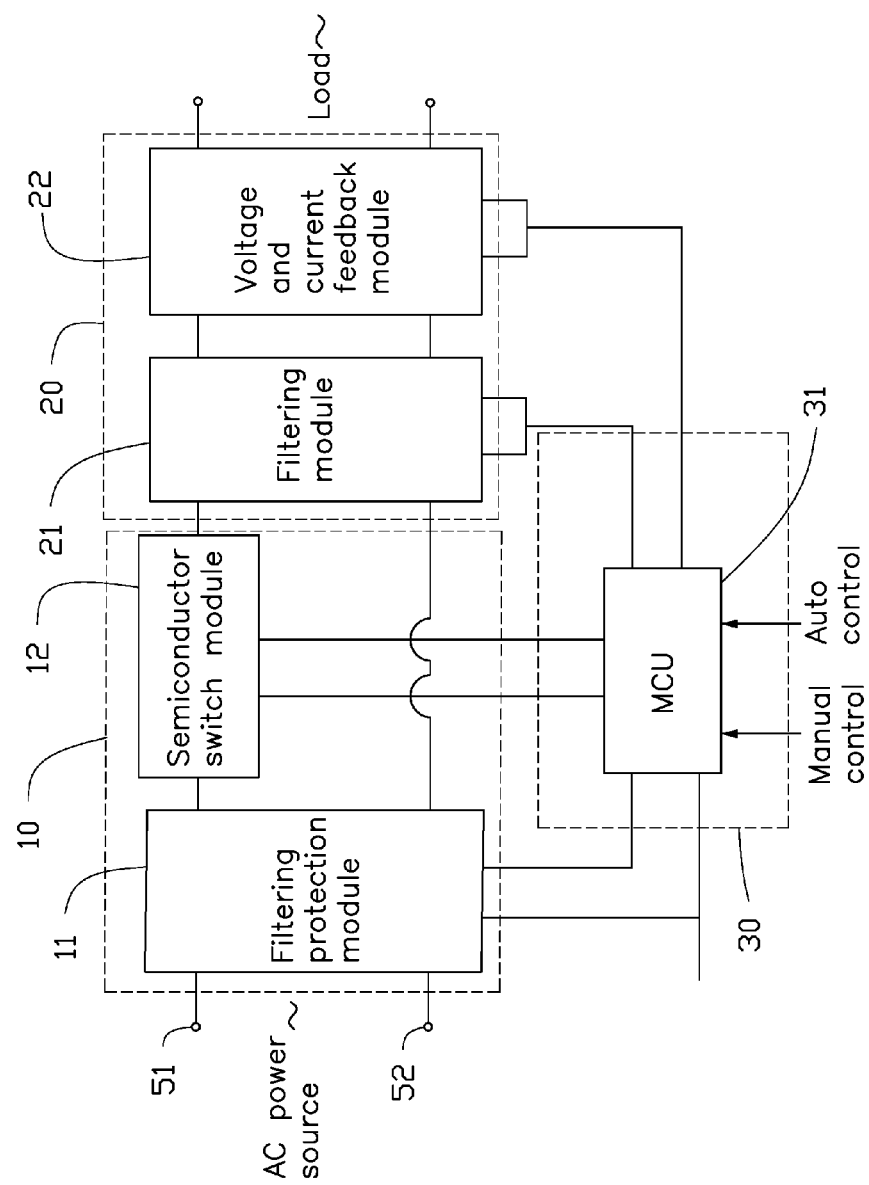
FIG. 6 is a block diagram of a non-isolated single-phase low power transmitting apparatus for digitally controlling voltage and current of alternating current in accordance with the first embodiment of the present invention.

FIG. 6 illustrates a block diagram of a non-isolated single-phase low power transmitting apparatus for digitally controlling voltage and current of alternating current. The input interface of the filtering protection module 11 is connected to the AC power source, and an output interface of the filtering protection module 11 is connected to the semiconductor switch module 12, the filtering module 21, and the voltage and current feedback module 22. Additionally, the filtering protection module 11, the semiconductor switch module 12, the filtering module 21, and the voltage and current feedback module 22 are electrically connected to the MCU 31.

Figure 7:
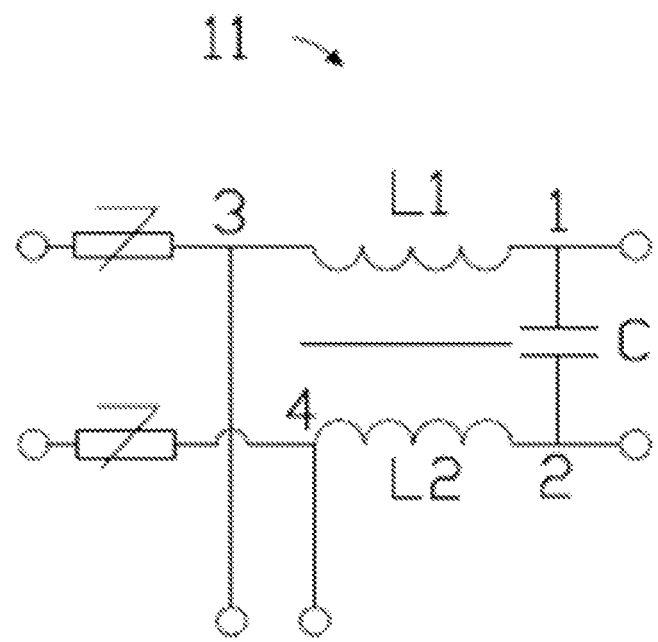
FIG. 7 is a circuit diagram of the filtering protection module in accordance with the first embodiment of the present invention.

FIG. 7 illustrates a circuit diagram of the filtering protecting module 11 including a first varistor, a second varistor, a first common-mode inductor L1, a second common-mode inductor L2, and a capacitor. A live wire 51 and a neutral wire 52 from the AC power source are connected to the input part 10. The first varistor and the first common-mode inductor L1 are is series with the live wire 51, and the second varistor and the second common-mode inductor L2 are in series with the neutral wire 52, and the capacitor is connected to a node 1 of the live wire 51 and a node 2 of the neutral wire 52 and thus is in parallel with the first common-mode inductor L1 and the second common-mode inductor L2. Additionally, a node 3 of the live wire 51 and a node 4 of the neutral wire 52 are electrically connected to MCU 31 for providing the AC signal from the AC power source to the MCU 31. In FIG. 7, the common-mode inductor L1 and the common-mode inductor L2 are used to filter common-mode signals of the AC signal, and the first varistor and the second varistor are used for voltage limitation by utilizing non-linear characteristics of the varistor. The varistor is a voltage clamping device that limits the input voltage value to a safety level for providing circuit protection.

Figure 8:
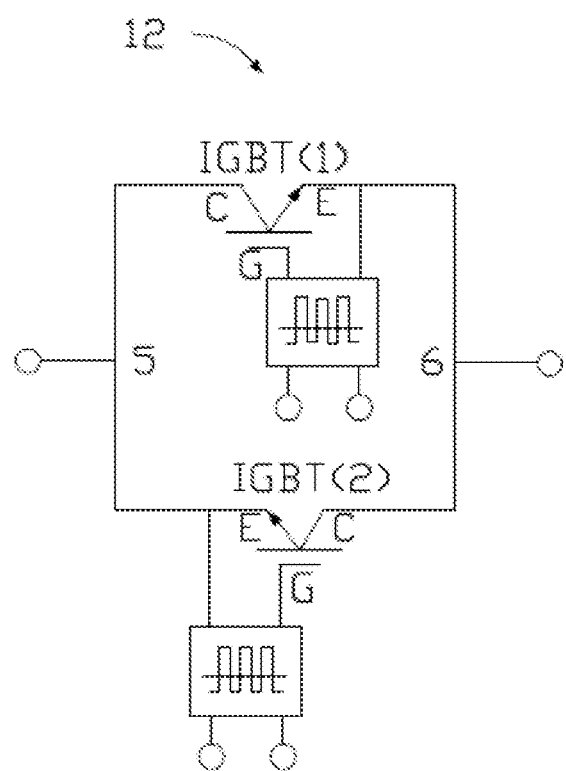
FIG. 8 is a circuit diagram of the semiconductor switch module in accordance with the first embodiment of the present invention.

FIG. 8 is a circuit diagram of the semiconductor switch module 12 including a first semiconductor switch IGBT (1) and a second semiconductor switch IGBT (2) in series with the first semiconductor switch IGBT (1). The first semiconductor switch IGBT (1) has an emitter E connected to a second livewire node 6, a collector C connected to a first livewire node 5, and a gate G connected to the MCU 31, respectively. The second semiconductor switch IGBT (2) has an emitter E connected to the first livewire node 5, a collector C connected to the second livewire node 6, and a gate G connected to the MCU 31, respectively. The first semiconductor switch IGBT (1) and the second semiconductor switch IGBT (2) could be adapted to precisely control the output sinusoidal wave of the AC signal.

Figure 9:
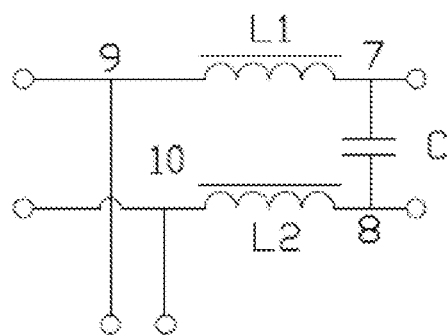
FIG. 9 is a circuit diagram of the filtering module in accordance with the first embodiment of the present invention.

FIG. 9 is a circuit diagram of the filtering module 21 including a first inductor L1, a second inductor L2 and a capacitor C. The first inductor L1 is connected to and in series with the live wire 51, and the second inductor L2 is connected to and in series with the neutral wire 52. The capacitor C is connected to a node 7 of the live wire 51 and to a node 8 of the neutral wire 52, and the capacitor C is in parallel with the first inductor L1 and the second inductor L2. Additionally, the node 9 and the node 10 are connected to the MCU 31 for providing the AC signal filtered by the filtering module 21. Namely, the combination of the first inductor L1, the second inductor L2, and the capacitor C realizes filtering and anti-interference regarding the processing of the AC signal.

Figure 10:
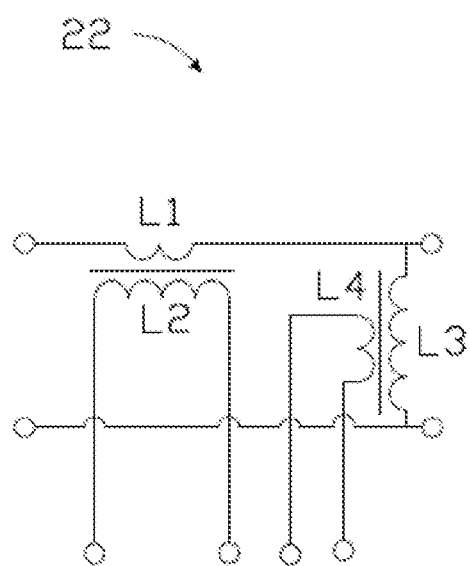
FIG. 10 is a circuit diagram of the voltage current feedback module in accordance with the first embodiment of the present invention.

FIG. 10 is a circuit diagram of the voltage and current feedback module 22 including a current feedback module formed by a first inductor L1 and a second inductor L2 and a voltage feedback module formed by a third inductor L3 and a fourth inductor L4. The current feedback module is electrically connected to the live wire 51, and the voltage feedback module is electrically connected to the live wire 51 and to the neutral wire 52. Thus the current and the voltage of the AC signal outputted from the semiconductor switch module 12 is able to be properly detected by the current feedback module and the voltage feedback module respectively, and the voltage and current feedback module 22 provides feedback signals to the MCU 31, the feedback signals corresponding to the current and the voltage of the AC signal outputted from the semiconductor switch module 12.

Figure 11:
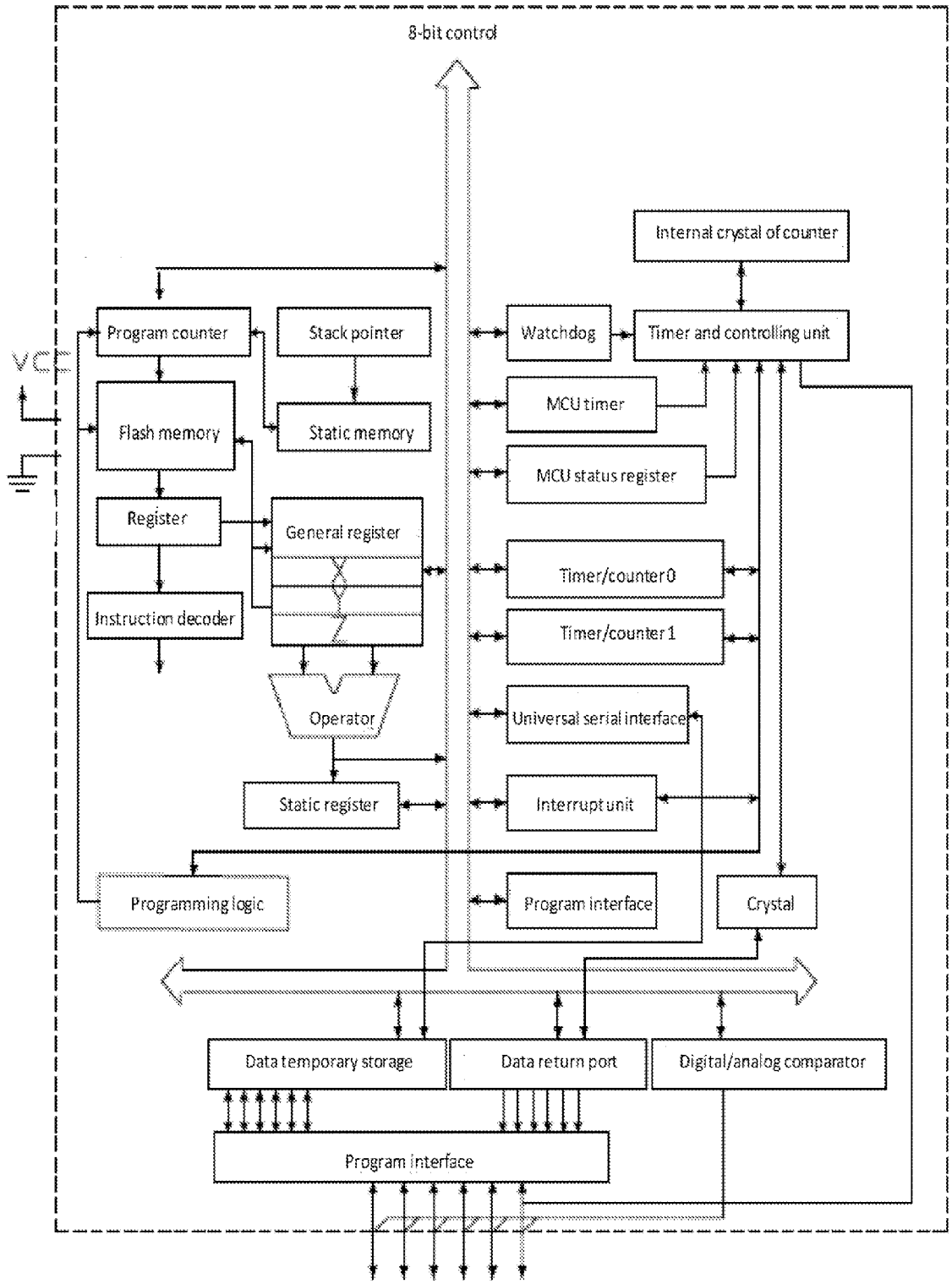
FIG. 11 is an illustrative scheme of a MCU in accordance with the first embodiment of the present invention.

FIG. 11 is an illustrative scheme of the MCU 31. The MCU 31 comprises an 8-bit control bus and a plurality of functional units connected to the 8-bit control bus. The plurality of functional units include a program counter, a flash memory, a register, an instruction decoder, a programming logic, a stack pointer, a static memory, a general register, an operator, a static register, a watchdog, a MCU timer, a MCU status register, a timer/counter 0, a timer/counter 1, a universal serial interface, a interrupt unit, a data memory, an internal crystal of counter, a timer and controlling unit, a crystal, a digital/analog comparator, a data return port, a data temporary storage port, and a program interface. A program is step up in the MCU 31 for collecting the signals coming from the filtering protection module 11, the semiconductor switch module 12, the filtering module 21, and the voltage and current feedback module 22 for performing collection, analysis, comparison, and calculation. Consequently, the MCU 31 provides control signals to switch the first semiconductor IGBT switch (1) and the second semiconductor IGBT switch (2) respectively, thereby precisely controlling the separation and merge of the sinusoidal wave of the AC signal in a range of 50 Hz to 60 Hz.

Figure 12:
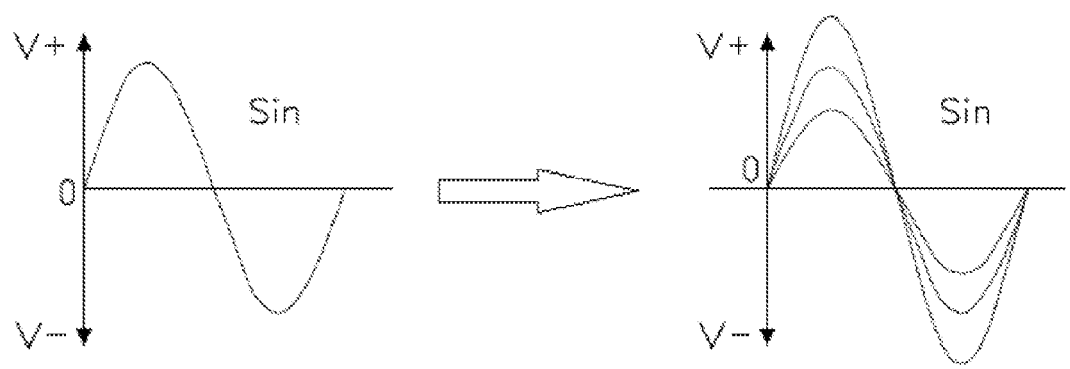
FIG. 12 is a diagram showing a transformation of the input sinusoidal wave of the AC signal in accordance with the first embodiment of the present invention.

FIG. 12 illustrates a transformation of the input sinusoidal wave of the AC signal in the input part 10. The input sinusoidal wave of the AC signal is transformed to a plurality of amplitude-adjustable sinusoidal waves according to a voltage converting mechanism.

Figure 13:
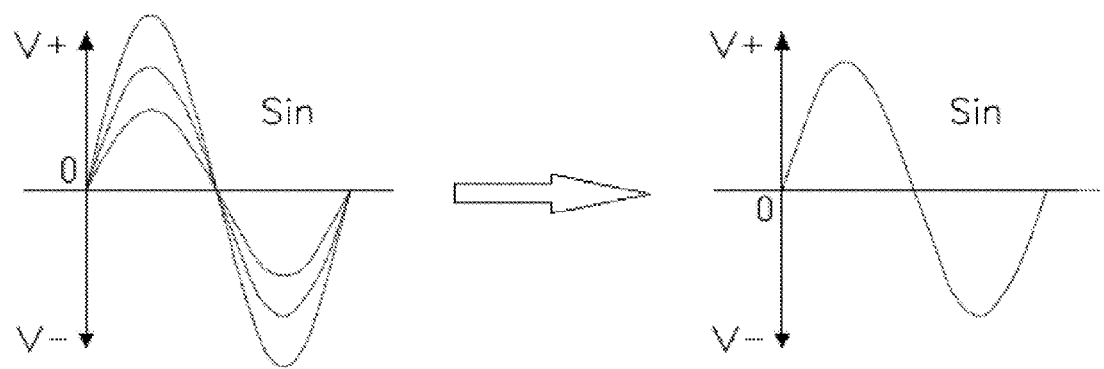
FIG. 13 is a diagram showing a transformation of the output sinusoidal wave of the AC signal in accordance with the first embodiment of the present invention

FIG. 13 illustrates a transformation of the output sinusoidal wave of the AC signal in the input part 10. The plurality of amplitude-adjustable sinusoidal waves of the AC signal are merged to the output sinusoidal wave of the AC signal substantially identical to an input sinusoidal wave of the AC signal according to the voltage converting mechanism.

Figure 14:
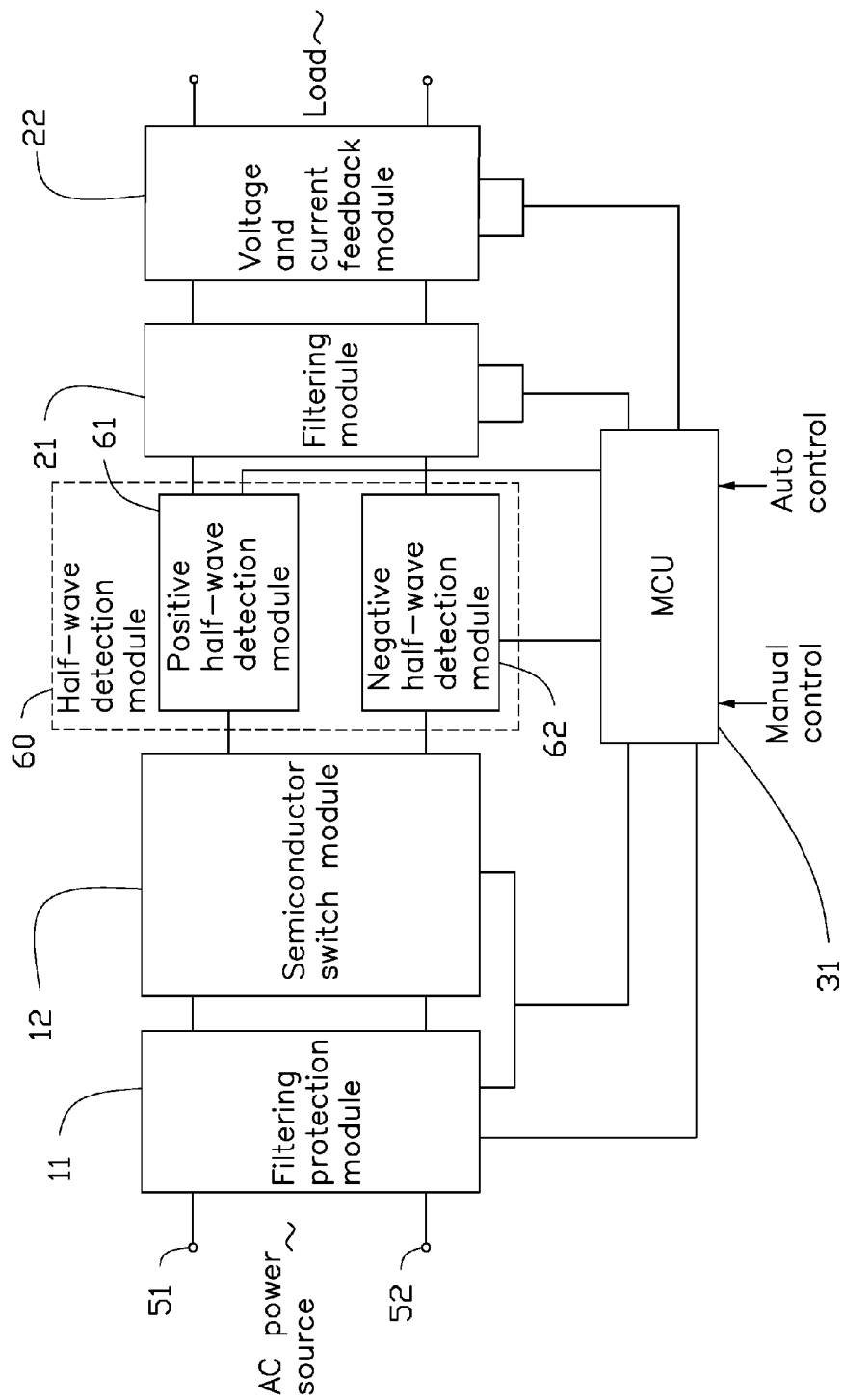
FIG. 14 is a block diagram of a non-isolated single-phase large power transmitting apparatus for digitally controlling voltage and current of alternating current in accordance with a second embodiment of the present invention.

FIG. 14 is a schematic illustration of a non-isolated single-phase power transmitting apparatus for digitally controlling voltage and current of alternating current in accordance with a second embodiment. The second embodiment is basically similar to the first embodiment, regarding the input part 10 and the output part 20. The differences are that a half-wave detection module 60 is connected to the input part 10 and to the output part 20. The half-wave detection module 60 includes a positive half-wave detection module 61 connected to the live wire 51 and a negative half-wave detection 62 module connected the neutral wire 52. The positive half-wave detection module 61 is utilized to detect the phase, starting point, and the current of the positive half-wave of the output sinusoidal wave of the AC signal, and the negative half-wave detection module 62 is utilized to detect the phase, starting point, and the current of the negative half-wave of the output sinusoidal wave of the AC signal, thus preserving the waveform symmetry of the positive half-wave and the negative half-wave of the output sinusoidal wave of the AC signal.

Figure 15:
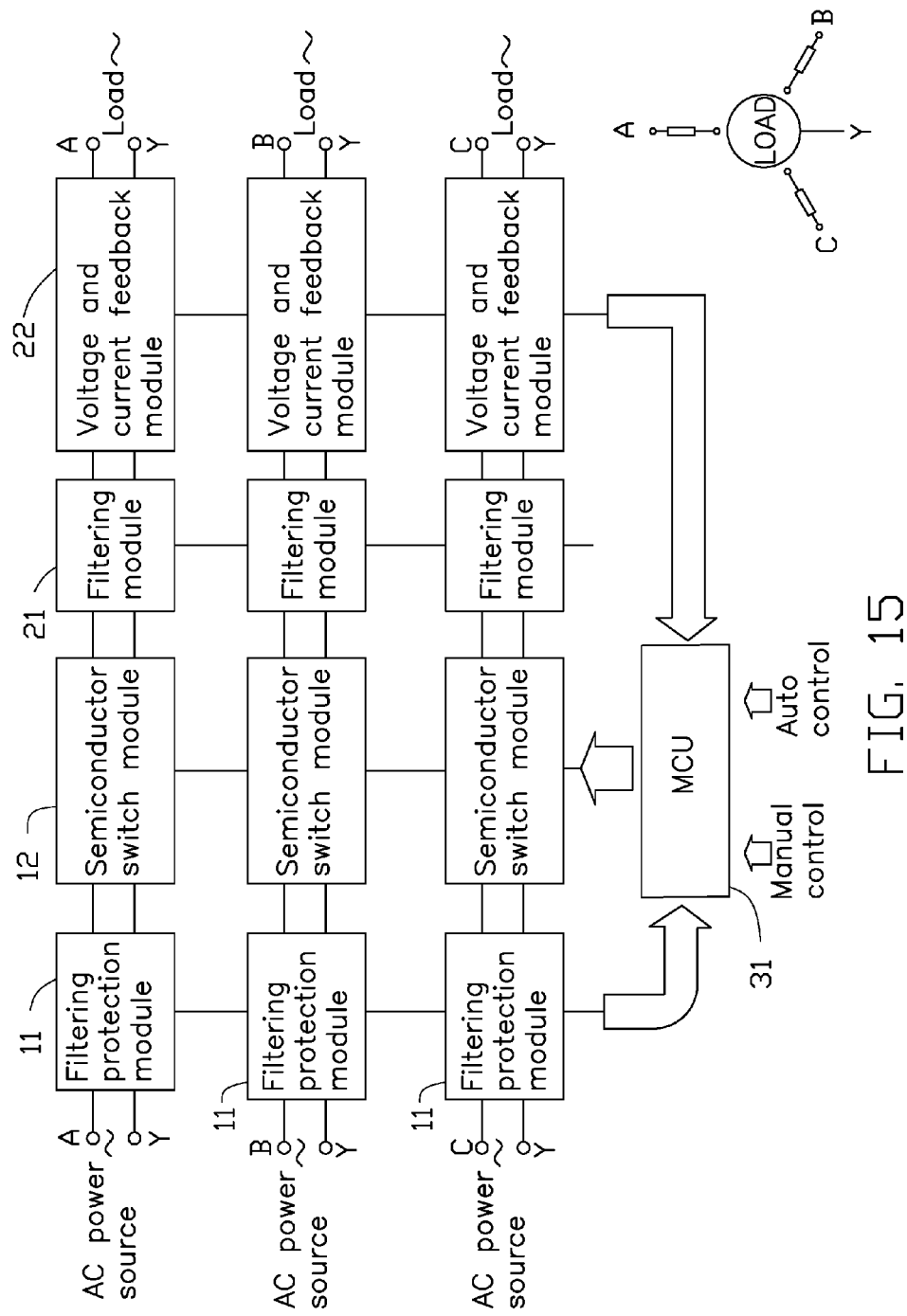
FIG. 15 is a block diagram of a non-isolated three-phase power transmitting apparatus for digitally controlling voltage and current of alternating current in accordance with a third embodiment of the present invention.

FIG. 15 is a block diagram of a three-phase power transmitting apparatus for digitally controlling voltage and current of alternating current in accordance with a third embodiment of the present invention. The third embodiment is basically similar to the first embodiment. The differences are that, in the third embodiment, the electrical structure of each phase of a three-phase alternating current circuit has its own input part 10 and its own output part 20. In addition, all the input parts 10 are electrically connected to one another and are connected to the digital control part 30. Also, all the output parts 20 are electrically connected to one another and are connected to the digital control part 30. Therefore, the MCU 31 can precisely control the parameters of the input part 10 and those of the output parts 20.

Figure 16:
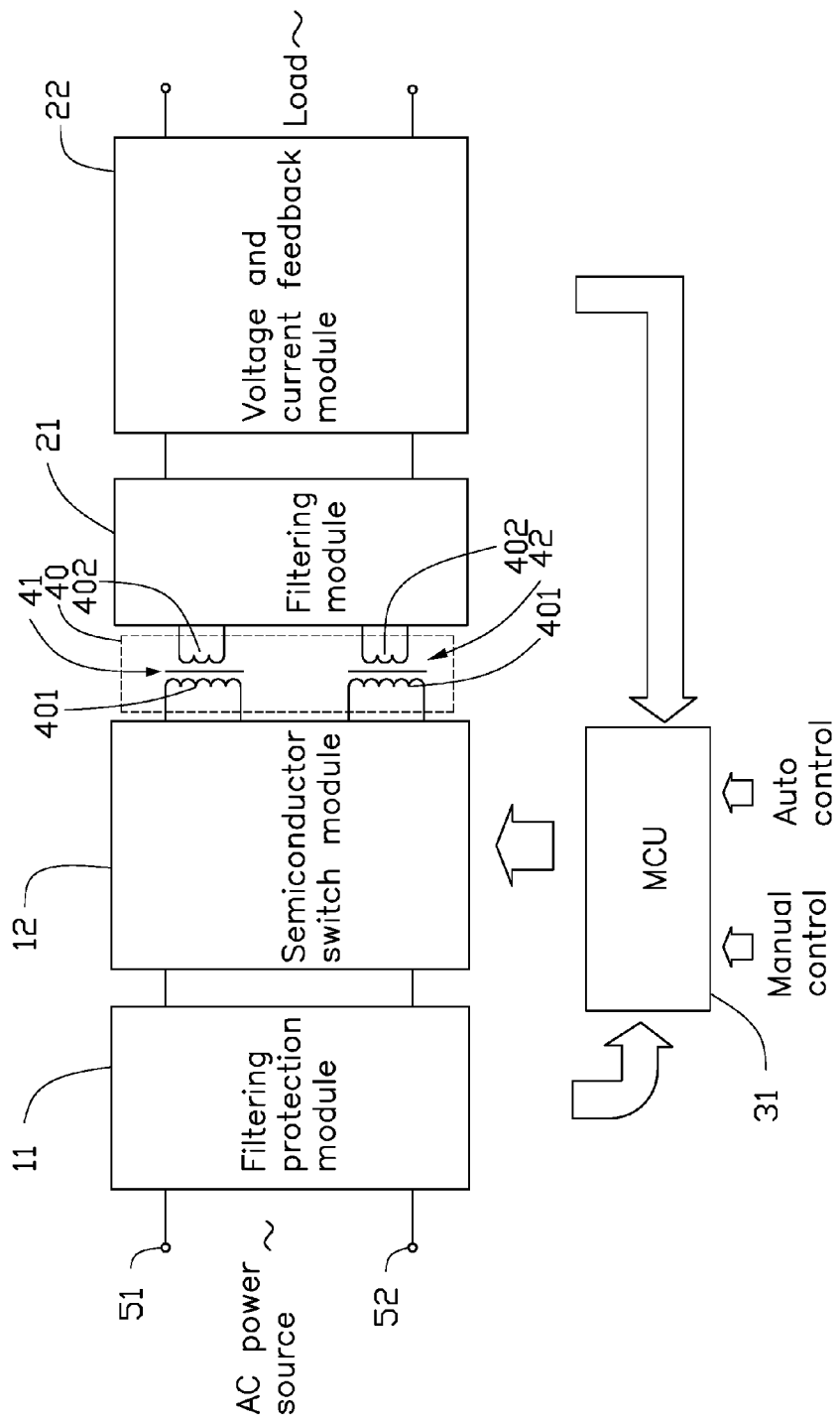
FIG. 16 is a block diagram of an isolated single-phase large power transmitting apparatus for digitally controlling voltage and current of alternating current in accordance with a fourth embodiment of the present invention.
Figure 17:
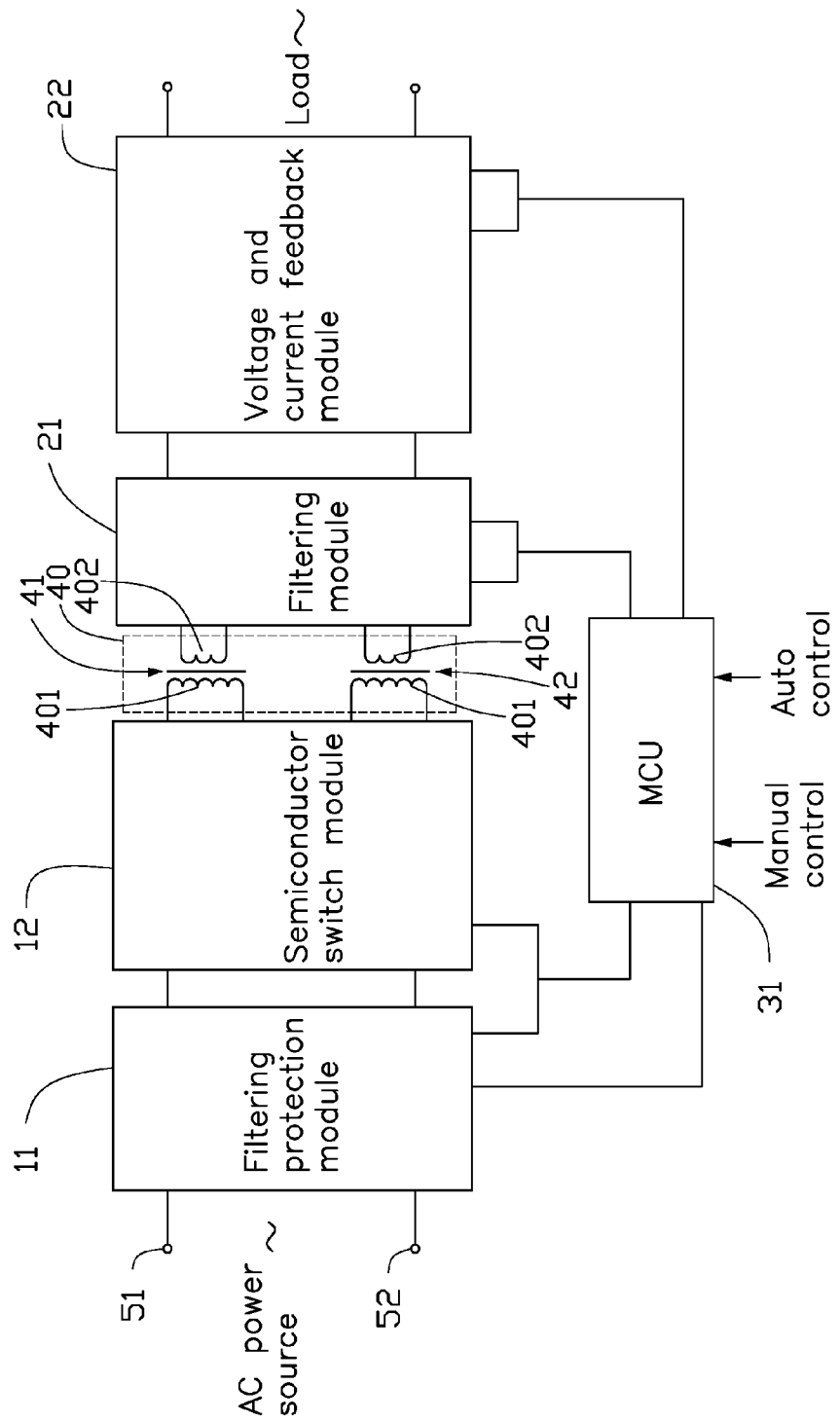
FIG. 17 is a block diagram of an isolated single-phase large power transmitting apparatus for digitally controlling voltage and current of alternating current in accordance with the fourth embodiment of the present invention.

FIG. 16 and FIG. 17 are block diagrams of an isolated power transmitting apparatus for digitally controlling voltage and current of alternating current in accordance with a fourth embodiment of the present invention. The isolation is realized through the implement of the transformer part 40 in the fourth embodiment. The fourth embodiment is basically similar to the first embodiment, regarding the input part 10, output part 20, and the digital control part 30. The differences are that, in the fourth embodiment, the transformer part 40 is disposed between the input part 10 and the output part 20 and is also connected to the input part 10 and the output part 20 respectively, thus realizing isolation. The transformer part 40 includes a first transformer 41 and a second transformer 42. A primary coil 401 of the first transformer 41 and a primary coil 401 of the second transformer 42 are electrically connected to the semiconductor switch module 12. The secondary coil 402 of the first transformer 41 and the secondary coil 402 of the second transformer 42 are electrically connected to the filtering module 21.

Figure 18:
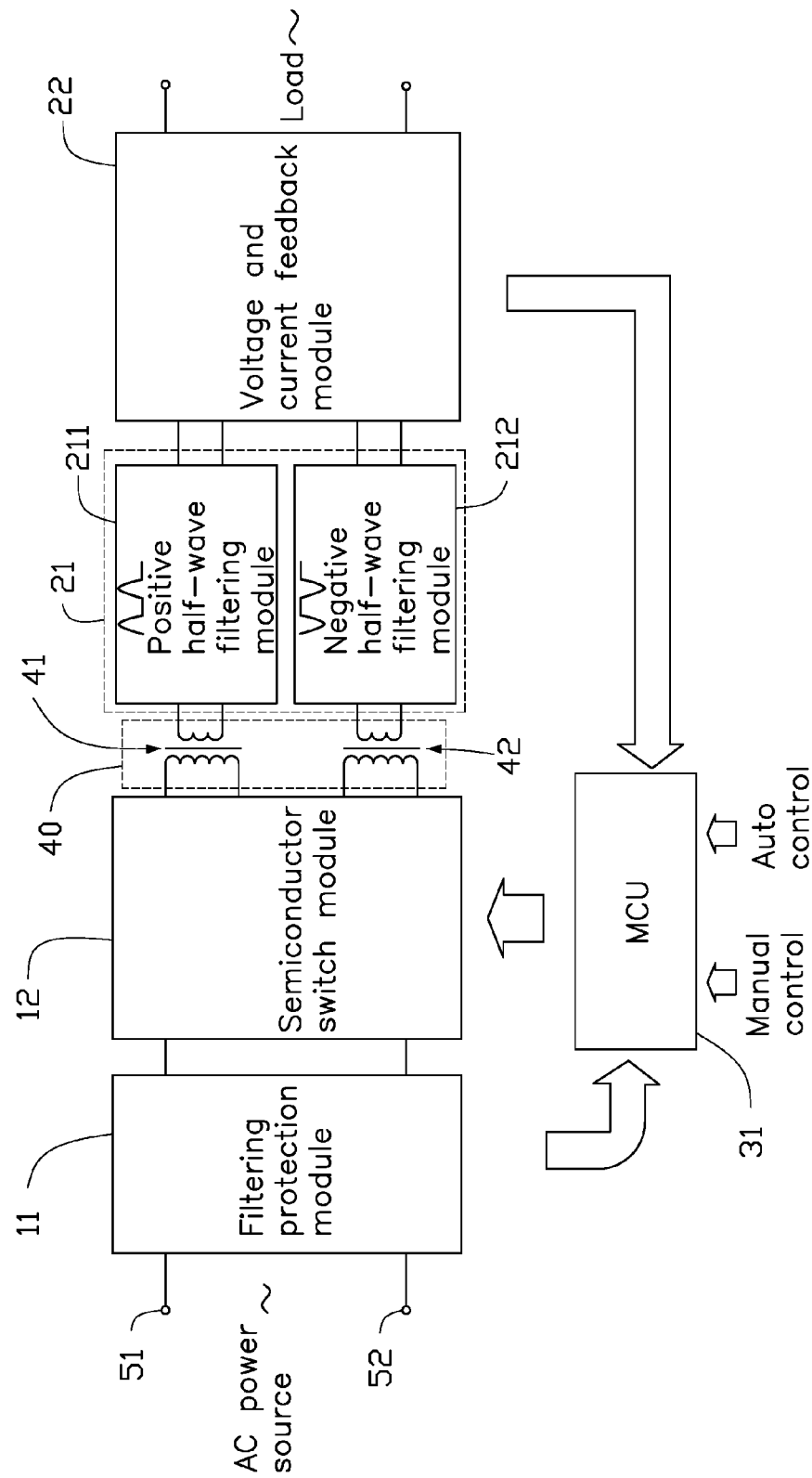
FIG. 18 is a block diagram of an isolated single-phase power transmitting apparatus for digitally controlling voltage and current of alternating current in accordance with a fifth embodiment of the present invention.

FIG. 18 is a block diagram of a single-phase power transmitting apparatus for digitally controlling voltage and current of alternating current in accordance with a fifth embodiment of the present invention. The fifth embodiment is basically similar to the fourth embodiment, regarding the input part 10, output part 20, and the digital control part 30. The differences are that, in the fifth embodiment, the filtering module 21 includes a positive half-wave filtering module 211 and a negative half-wave filtering module 212. The positive half-wave filtering module 211 is connected to the secondary coil 402 of the first transformer 41 and to the voltage and current feedback module 22, and the negative half-wave filtering module 212 is connected to the secondary coil 402 of the second transformer 42 and to the voltage and the current feedback module 22.

Figure 19:
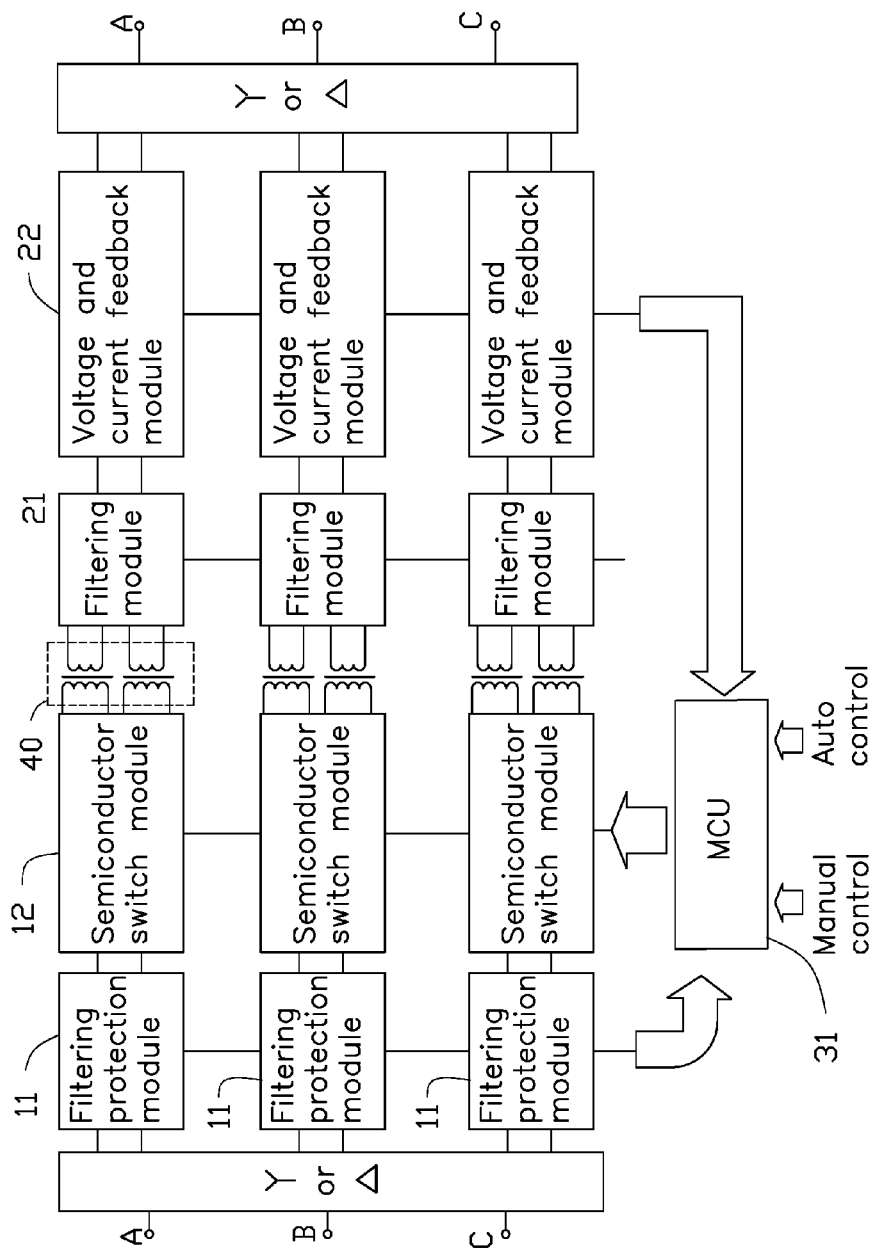
FIG. 19 is a block diagram of an isolated three-phase large power transmitting apparatus for digitally controlling voltage and current of alternating current in accordance with a sixth embodiment of the present invention.

FIG. 19 is a block diagram of a three-phase large power transmitting apparatus for digitally controlling voltage and current of alternating current in accordance with a sixth embodiment of the present invention. The three-phase alternating current circuit in the sixth embodiment may be arranged in delta connection (Δ) or star connection (Y). The sixth embodiment of the present invention is basically similar to the fourth embodiment. The differences are that, in the sixth embodiment, the electrical structure of each phase of a three-phase alternating current circuit has its own input part 10 and its own output part 20. In addition, all the input parts 10 are electrically connected to one another and are connected to the digital control part 30. Also, all the output parts 20 are electrically connected to one another and are connected to the digital control part 30. Therefore, the MCU 31 can precisely control the parameters of the input part 10 and those of the output parts 20.

Previous descriptions are only embodiments of the present invention and are not intended to limit the scope of the present invention. Many variations and modifications according to the claims and specification of the disclosure are still within the scope of the claimed invention. In addition, each of the embodiments and claims does not have to achieve all the advantages or characteristics disclosed. Moreover, the abstract and the title only serve to facilitate searching patent documents and are not intended in any way to limit the scope of the claimed invention.

What is claimed is:

1. A power transmitting apparatus for digitally controlling voltage and current of alternating current (AC), comprising:
    an input part, wherein the input part has a filtering protection module and a semiconductor switch module connected to the filtering protection module, the filtering protection module having an input interface for inputting an AC signal from a power source;
    an output part, wherein the output part has a filtering module and a voltage and current feedback module connected to the filtering module, the voltage and current feedback module having an output interface for outputting the AC signal from the input part, and wherein the filtering module is connected to the semiconductor switch module of input part; and
    a digital control part, wherein the digital control part has a microcontroller unit (MCU) electrically connected to the filtering protection module, the semiconductor switch module, and the voltage and current feedback module, respectively;
    wherein the AC signal is sequentially transmitted through an input interface to the filtering protection module for voltage limitation and filtering and to the semiconductor switch module, and a trigger signal is sent from the filtering protection module to the MCU so as to switch the MCU into an operating mode while the filtering protection module outputs the AC signal to the semiconductor switch module;
    wherein the semiconductor switch module separates an input sinusoidal wave of the AC signal into amplitude-adjustable positive and negative half-wave signals, and the amplitude-adjustable positive and negative half-wave signals are filtered and merged to an output sinusoidal wave of the AC signal, the output sinusoidal wave substantially identical to the input sinusoidal wave; and
    wherein the voltage and current feedback module receives the output sinusoidal wave as feedback to the MCU so that the MCU is able to control the switching state of the semiconductor switch module, thereby forming a close loop.

2. The apparatus of claim 1, wherein the semiconductor switch module is electrically connected to a live wire of the AC signal.

3. The apparatus of claim 2, wherein the semiconductor switch module further comprises:
    a first semiconductor switch connected to a first semiconductor device and a second semiconductor switch connected to a second semiconductor device, wherein the first semiconductor device and the second semiconductor device are disposed between a first livewire node and a second livewire node, wherein the first semiconductor device has an emitter connected to the second livewire node, a collector connected to the first livewire node, and a base connected to the MCU, respectively, and the second semiconductor device has an emitter connected to the first livewire node, a collector connected to the second livewire node, and a base connected to the MCU, respectively.

4. The apparatus of claim 1, wherein the filtering protection module further comprises:
    a first varistor and a second varistor for overvoltage protection, wherein the first varistor is connected to a live wire, and the second varistor is connected to a neutral wire;
    a first inductor and a second inductor, wherein the first inductor is connected to the live wire, and the second inductor is connected to the neutral wire; and
    a capacitor, wherein the capacitor is electrically connected to the first inductor and the second inductor, thereby forming a filtering circuit for filtering common mode signals.

5. The apparatus of claim 1, wherein the filtering module further comprises:
    a first inductor and a second inductor, wherein the first inductor is connected to a live wire, and the second inductor is connected to a neutral wire; and
    a capacitor, wherein the capacitor is connected to the live wire and to the neutral wire.

6. The apparatus of claim 1, wherein the voltage and current feedback module further comprises:
    a current feedback module, wherein the current feedback module connected to a live wire includes a first inductor and a second inductor; and
    a voltage feedback module, wherein the voltage feedback module connected to the live wire and to a neutral wire includes a third inductor and a fourth inductor.

7. The apparatus of claim 1, wherein the MCU further comprises: an 8-bit control bus and a plurality of functional units connected to the 8-bit control bus, wherein a plurality of functional units includes a program counter, a flash memory, a register, an instruction decoder, a programming logic, a stack pointer, a static memory, a general register, an operator, a static register, a watchdog, a MCU timer, a MCU status register, a timer/counter 0, a timer/counter 1, a universal serial interface, an interrupt unit, a data memory, an internal crystal of counter, a timer and controlling unit, a crystal, a digital/analog comparator, a data return port, a data temporary storage port, and a program interface.

8. The apparatus of claim 1, wherein a half-wave detection module is connected to the semiconductor switch module of the input part and to the filtering module of the output part, wherein the half-wave detection module includes a positive half-wave detection module connected to a live wire and a negative half-wave detection module connected a neutral wire.

9. The apparatus of claim 1, wherein a first transformer and a second transformer are connected to the semiconductor switch module of the input part and to the filtering module of the output part, wherein a primary coil of the first transformer and a primary coil of the second transformer are electrically connected to the semiconductor switch module, and the secondary coil of the first transformer and the secondary coil of the second transformer are electrically connected to the filtering module.

10. The apparatus of claim 1, wherein the filtering module further comprises a positive half-wave filtering module and a negative half-wave filtering module.

11. A power transmitting apparatus for digitally controlling voltage and current of alternating current, comprising:
- a three-phase alternating current circuit, wherein the three-phase alternating current circuit is arranged in delta connection (Δ) or star connection (Y), wherein each phase of the three-phase alternating current circuit comprises:
- an input part, wherein the input part has a filtering protection module and a semiconductor switch module connected to the filtering protection module, the filtering protection module having an input interface for inputting an AC signal from a power source;
- an output part, wherein the output part has a filtering module and a voltage and current feedback module connected to the filtering module, the voltage and current feedback module having an output interface for outputting the AC signal from the input part, and wherein the filtering module is connected to the semiconductor switch module of input part; and
- a digital control part, wherein the digital control part has a MCU electrically connected to each of the filtering protection modules, each of the semiconductor switch modules, and each of the voltage and current feedback module, respectively; wherein the AC signal is sequentially transmitted through an input interface to the filtering protection modules for voltage limitation and filtering and to the semiconductor switch modules, and a trigger signal is sent from the filtering protection modules to the MCU so as to switch the MCU into an operating mode while the filtering protection modules outputs the AC signal to the semiconductor switch modules;
- wherein each of the semiconductor switch module separates an input sinusoidal wave of the AC signal into amplitude-adjustable positive and negative half-wave signals, and the amplitude-adjustable positive and negative half-wave signals are filtered and merged to an output sinusoidal wave of the AC signal, the output sinusoidal wave substantially identical to the input sinusoidal wave; and
- wherein the voltage and current feedback modules receive the output sinusoidal waves as feedback to the MCU so that the MCU is able to control the switching state of the semiconductor switch modules, thereby forming a close loop.

12. The apparatus of claim 11, wherein the semiconductor switch module is electrically connected to a live wire of the AC signal.

13. The apparatus of claim 12, wherein the semiconductor switch module further comprises:
- a first semiconductor switch connected to a first semiconductor device and a second semiconductor switch connected to a second semiconductor device, wherein the first semiconductor device and the second semiconductor device are disposed between a first livewire node and a second livewire node, wherein the first semiconductor device has an emitter connected to the second livewire node, a collector connected to the first livewire node, and a base connected to the MCU, respectively, and the second semiconductor device has an emitter connected to the first livewire node, a collector connected to the second livewire node, and a base connected to the MCU, respectively.

14. The apparatus of claim 11, wherein the filtering protection module further comprises:
- a first varistor and a second varistor for overvoltage protection, wherein the first varistor is connected to a live wire, and the second varistor is connected to a neutral wire;
- a first inductor and a second inductor, wherein the first inductor is connected to the live wire, and the second inductor is connected to the neutral wire; and
- a capacitor, wherein the capacitor is electrically connected to the first inductor and the second inductor, thereby forming a filtering circuit for filtering common mode signals.

15. The apparatus of claim 11, wherein the filtering module further comprises:
- a first inductor and a second inductor, wherein the first inductor is connected to a live wire, and the second inductor is connected to a neutral wire; and
- a capacitor, wherein the capacitor is connected to the live wire and to the neutral wire.

16. The apparatus of claim 11, wherein the voltage and current feedback module further comprises:
- a current feedback module, wherein the current feedback module connected to a live wire includes a first inductor and a second inductor; and
- a voltage feedback module, wherein the voltage feedback module connected to the live wire and to a neutral wire includes a third inductor and a fourth inductor.

17. The apparatus of claim 11, wherein the MCU further comprising an 8-bit control bus and a plurality of functional units connected to the 8-bit control bus, wherein a plurality of functional units includes a program counter, a flash memory, a register, an instruction decoder, a programming logic, a stack pointer, a static memory, a general register, an operator, a static register, a watchdog, a MCU timer, a MCU status register, a timer/counter 0, a timer/counter 1, a universal serial interface, an interrupt unit, a data memory, an internal crystal of counter, a timer and controlling unit, a crystal, a digital/analog comparator, a data return port, a data temporary storage port, and a program interface.

18. The apparatus of claim 11, wherein a half-wave detection module is connected to the semiconductor switch module of the input part and to the filtering module of the output part, wherein the half-wave detection module includes a positive half-wave detection module connected to a live wire and a negative half-wave detection module connected a neutral wire.

19. The apparatus of claim 11, wherein a first transformer and a second transformer are connected to the semiconductor switch module of the input part and to the filtering module of the output part, wherein a primary coil of the first transformer and a primary coil of the second transformer are electrically connected to the semiconductor switch module, and the secondary coil of the first transformer and the secondary coil of the second transformer are electrically connected to the semiconductor filtering module.

20. The apparatus of claim 11, wherein the filtering module further comprises a positive half-wave filtering module and a negative half-wave filtering module.

* * * * *